(12) United States Patent
Asami

(10) Patent No.: US 7,345,776 B2
(45) Date of Patent: Mar. 18, 2008

(54) INFORMATION PROCESSING APPARATUS AND METHOD

(75) Inventor: Yuriyo Asami, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 11/091,625

(22) Filed: Mar. 29, 2005

(65) Prior Publication Data

US 2005/0179925 A1     Aug. 18, 2005

Related U.S. Application Data

(62) Division of application No. 09/664,379, filed on Sep. 18, 2000, now Pat. No. 6,891,637.

(30) Foreign Application Priority Data

Sep. 30, 1999   (JP)   ................................ 11-279383

(51) Int. Cl.
   *B41J 3/60*      (2006.01)
   *G06K 15/02*     (2006.01)
   *G06K 15/12*     (2006.01)
   *G06F 3/14*      (2006.01)
   *G03G 15/36*     (2006.01)

(52) U.S. Cl. ..................... 358/1.13; 358/1.18; 358/1.6; 358/1.9; 358/401; 358/1.1; 399/183; 399/194; 399/309; 399/364

(58) Field of Classification Search ............... 358/1.13, 358/1.18, 1.6, 1.9, 1.1, 401; 399/183, 194, 399/309, 364
See application file for complete search history.

(56) References Cited

U.S. PATENT DOCUMENTS

| 4,763,161 | A | * | 8/1988 | Forest et al. ................... 399/84 |
| 5,124,731 | A | * | 6/1992 | Knodt et al. ................. 347/129 |
| 5,642,205 | A |   | 6/1997 | Kassmann ................... 358/468 |
| 5,713,061 | A |   | 1/1998 | Yoshioka ...................... 399/38 |
| 5,825,996 | A | * | 10/1998 | Davis et al. ................ 358/1.18 |
| 5,841,547 | A | * | 11/1998 | Takemoto et al. .......... 358/296 |
| 5,940,583 | A | * | 8/1999 | Taira et al. ................. 358/1.15 |
| 6,123,362 | A | * | 9/2000 | Squilla et al. ................ 283/67 |
| 6,313,919 | B1 | * | 11/2001 | Nakagiri et al. ........... 358/1.11 |

(Continued)

FOREIGN PATENT DOCUMENTS

EP     0889389 A2 *  1/1999

(Continued)

*Primary Examiner*—Aung S. Moe
*Assistant Examiner*—Beniyam Menberu
(74) *Attorney, Agent, or Firm*—Fitzpatrick, Cella, Harper & Scinto

(57) ABSTRACT

In an information processing apparatus when the body pages are set to start from the back side of the cover, the cover is printed on the first side of the first sheet, the first page of the body is printed on the second side of the first sheet, and the second and subsequent pages of the body are printed on both sides of the second and subsequent sheets. When the body pages are set to start from a sheet different from the cover, the cover is printed on the first side of the first sheet, only a background image of the cover is printed on the second side of the first sheet, which is the back side of the cover, and the body pages are printed on both sides of the second and subsequent sheets.

9 Claims, 12 Drawing Sheets

U.S. PATENT DOCUMENTS

| | | | |
|---|---|---|---|
| 6,678,069 B1 * | 1/2004 | Abe | 358/1.18 |
| 6,891,637 B1 * | 5/2005 | Asami | 358/1.18 |
| 6,903,762 B2 * | 6/2005 | Prabhu et al. | 348/207.1 |
| 7,027,180 B2 * | 4/2006 | Nishikawa et al. | 358/1.18 |
| 7,248,377 B2 * | 7/2007 | Nimura et al. | 358/1.12 |
| 2007/0279646 A1 * | 12/2007 | Sugimoto et al. | 358/1.1 |

FOREIGN PATENT DOCUMENTS

| | | | |
|---|---|---|---|
| JP | 10-232946 | | 9/1998 |
| JP | 11-170660 | * | 6/1999 |

* cited by examiner

801a

801b

802

INFORMATION PROCESSING APPARATUS AND METHOD

This is a divisional application of U.S. patent application Ser. No. 09/664,379, filed on Sept. 18, 2000, allowed on Dec. 26, 2004.

FIELD OF THE INVENTION

The present invention relates to an information processing apparatus and method for generating printing data as the basis for template data, and a computer-readable memory.

BACKGROUND OF THE INVENTION

In both-sided printing performed by a conventional printer, a system supplies the same printing data as in one-sided printing to the printer. Accordingly, odd-numbered pages in one-sided printing are printed on the front sides of printing paper sheets, and even-numbered pages are printed on their back sides.

In the case of a document having a cover, the first page of the text, subsequent to the cover sometimes needs to be started as the first page after the cover, not from the back side of the cover. In conventional both-sided printing, however, odd-numbered pages in one-sided printing are printed on the front sides of paper sheets, and even-numbered pages are printed on their back sides. Consequently, the first page following the cover is always the back side of the cover. Also, when an elaborately designed document such as an album is to be printed, if the total number of pages of the document is an odd number, the back side of the last page becomes white (=solid). This makes the document inappropriate in design.

SUMMARY OF THE INVENTION

The present invention has been made in consideration of the above problems, and has as its object to provide an information processing system, information processing apparatus and method and computer-readable memory, which can easily realize printing in a print layout desired by a user.

The present invention is characterized by an An information processing method of-printing a cover image and a plurality of body images on both sides of a plurality of sheets, comprising: a step of determining one of a first mode for printing a first image of a body on a first side of a second sheet and a second mode for printing the first image on a second side of a first sheet; a generation step of generating an image to be printed on the second side of the first sheet when the first mode is determined; and a printing control step of controlling printing such that when the second mode is determined, the cover image and the body images are printed on a first side of the first sheet and on the second side of the first sheet, respectively, sheet; and a generation step of generating an image to be inserted between the cover image and the body image when the second mode is determined.

The another aspect of the invention is, an information processing method of printing images on a plurality of pages on both sides of a plurality of sheets, comprising: a step of acquiring the total number of pages of the image of the plurality of pages; and a generation step of generating an image to be inserted between an image of the last page and an immediately preceding image thereof of the image of the plurality of pages, on the basis of the acquired total number of pages.

The another aspect of the invention is, an information processing apparatus for printing a cover image and a plurality of body images on both sides of a plurality of sheets, comprising: means for determining one of a first mode for printing a first image of a body on a first side of a second sheet and a second mode for printing the first image on a second side of a first sheet; generating means for generating an image to be printed on the second side of the first sheet when the first mode is determined; and printing control means for controlling printing such that when the second mode is determined, the cover image and the body images are printed on a first side of the first sheet and on the second side of the first sheet, respectively, and both sides of each subsequent sheet, and when the first mode is determined, the cover image, the image generated by said generating means, and the body images are printed on the first side of the first sheet, on the second side of the first sheet, respectively, and on both sides of each subsequent sheet starting from the first side of the second sheet.

The another aspect of the invention is, an information processing apparatus for printing images on a plurality of pages on both sides of a plurality of sheets, comprising: means for printing a first image of the image of the plurality of pages on a first side of a first sheet; generating means for automatically generating an image to be printed on a second side of the first sheet; and means for sequentially printing second and subsequent images on the plurality of pages on both sides of each subsequent sheet starting from a first side of a second sheet.

The another aspect of the invention is, an information processing apparatus for printing a cover image and body images on both sides of a plurality of sheets, comprising: means for determining one of a first mode for allowing the cover image and the body image to be printed on different sides of the same sheet and a second mode for inhibiting the cover image and the body image to be printed on different sides of the same sheet; and generating means for generating an image to be inserted between the cover image and the body image when the second mode is determined.

Another aspect of the invention is, an information processing apparatus for printing images on a plurality of pages, on both sides, comprising: means for acquiring the total number of pages of the images of the plurality of pages; and generating means for generating an image to be inserted between an image of the last page and an immediately preceding image thereof of the image including the plurality of pages, on the basis of the acquired total number of pages.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described below.

An example of an information processing system is disclosed in Japanese Patent Laid-Open No. 10-232946. In this system, a storage device or the like stores a plurality of types of templates (including a both-sided printing template and a one-sided printing template) having predetermined output formats. The system allows a user to select a desired template, fits output data such as a photographic image or character information to the selected template, and outputs the result. In this embodiment, the formation of an album using such an information processing system will be described.

Figure 1:
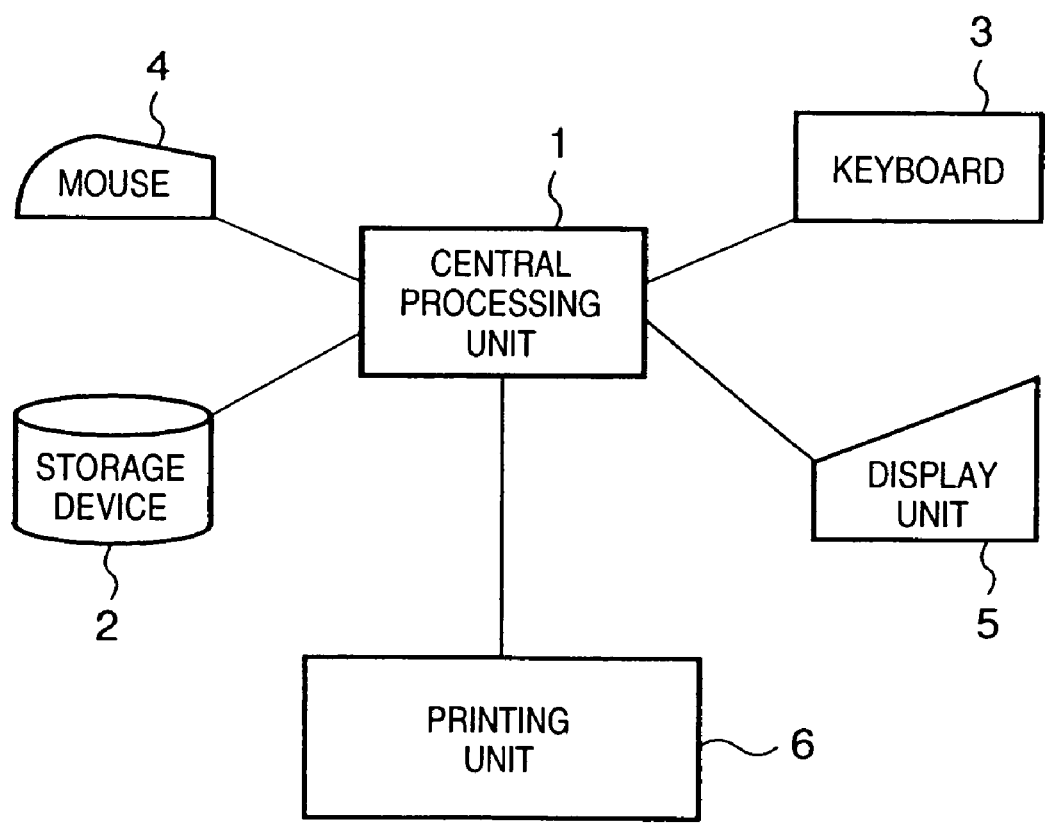
FIG. 1 is a block diagram showing a configuration of an information processing system to which a both-sided printing means of an embodiment of the present invention is applied.

FIG. 1 is a block diagram showing the configuration of an information processing system to which a both-sided printing function of the embodiment of the present invention is applied.

This information processing system comprises a central processing unit 1, a storage device 2, a keyboard 3, a mouse 4, a display unit 5, and a printing unit 6.

The central processing unit 1 includes a CPU, RAM, ROM, and the like (not shown). On the basis of control programs stored in the ROM or various programs for executing processing explained in the present invention, the CPU controls diverse components of this information processing system. The storage device 2 contains a storage medium such as a hard disk and stores various programs and various data including templates described above. This storage device 2 can also be an external storage device. The display unit 5 is, e.g., a CRT or an LCD and displays diverse information. This display unit 5 also displays GUI (Graphical User Interface) for executing processing explained in the present invention. A user can input various information by this GUI by using the mouse 4 and the keyboard 3. The printing unit 6 contains a printing engine of a printing system such as an inkjet system or a laser beam system. On the basis of output printing data from the central processing unit, the printing unit 6 prints an image on a printing medium.

An album template utilized in this embodiment includes templates for a cover page and a body page. It is possible to discriminate between these two types of pages by checking page attribute on the template. A plurality of such templates are stored in the storage device 2. When a user inputs an identification code given to each template by using the mouse 4 or the keyboard 3, the central processing unit 1 displays a template corresponding to the identification code on the display unit 5. The user can confirm the design of the template by viewing the displayed contents on the display unit 5 and determine an album template, which he or she desires. In this embodiment, it is assumed that a "cover" page is one page. However, the present invention is not limited to this embodiment, so a "cover" page can include images of a plurality of pages.

One template example will be described below.

Figure 2:
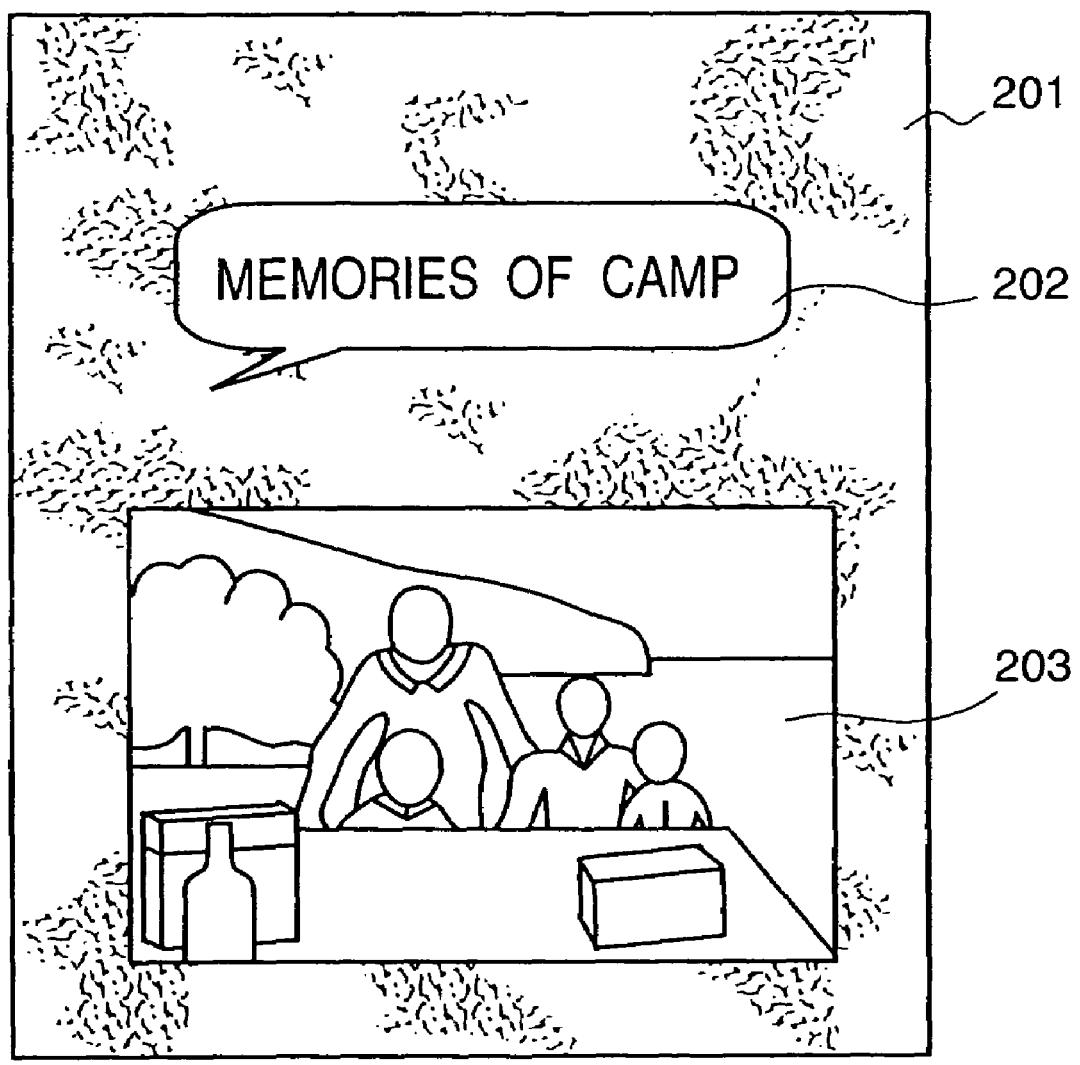
FIG. 2 is a view showing an example of a front cover page template of an album in the embodiment of the present invention.
Figure 3:
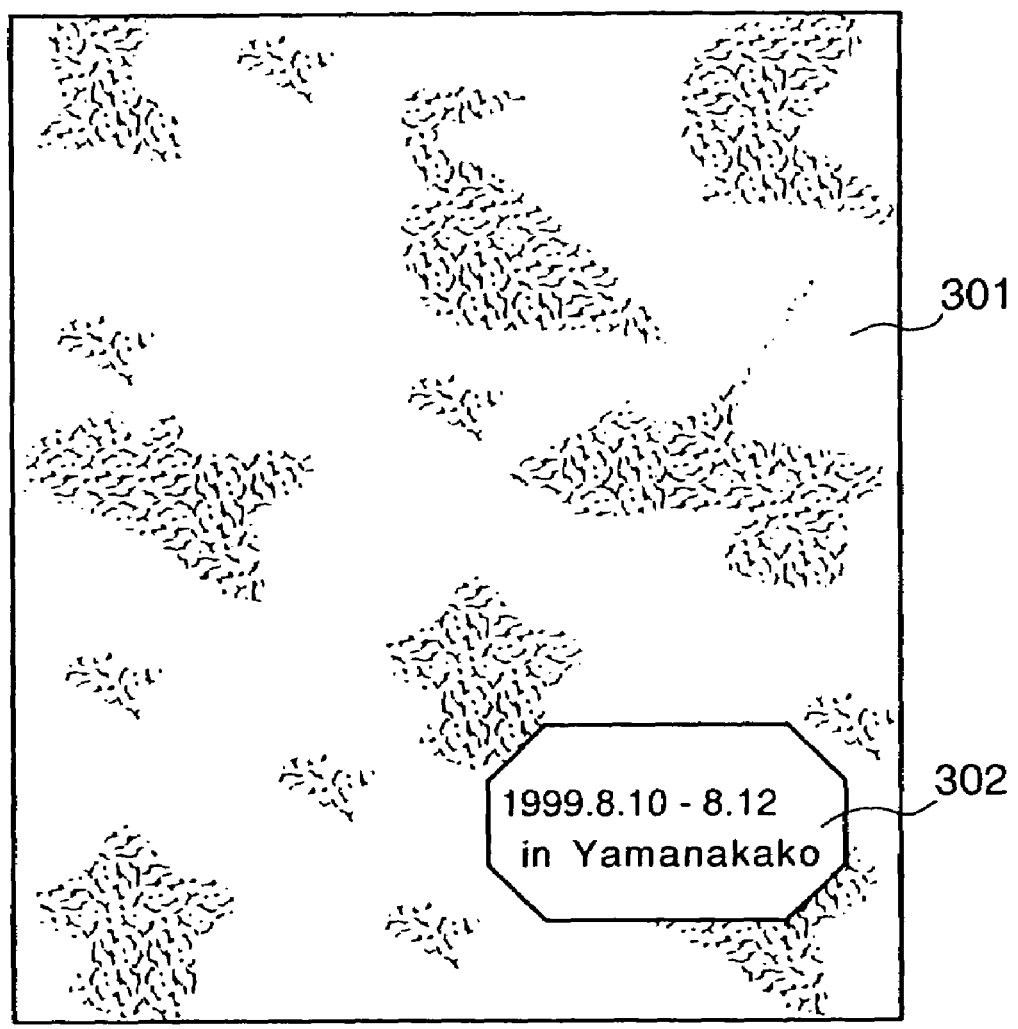
FIG. 3 is a view showing an example of a back cover page template of the album in the embodiment of the present invention.

FIG. 2 shows a cover (front) page of an album template chosen by a certain user. This cover (front) page is composed of wall paper 201 as a pasteboard, character frame 202 in which a cover title is placed, and image frame 203 in which a cover image is placed. The user fits a desired original character string and original photograph in character frame 202 and image frame 203, respectively, to form output data. FIG. 3 shows a cover (back) page of the same template. This cover (back) page is composed of wall paper 301 as a pasteboard and character frame 302 in which a back cover comment is placed. The user fits a desired original character string in character frame 302 to form output data.

Figure 4:
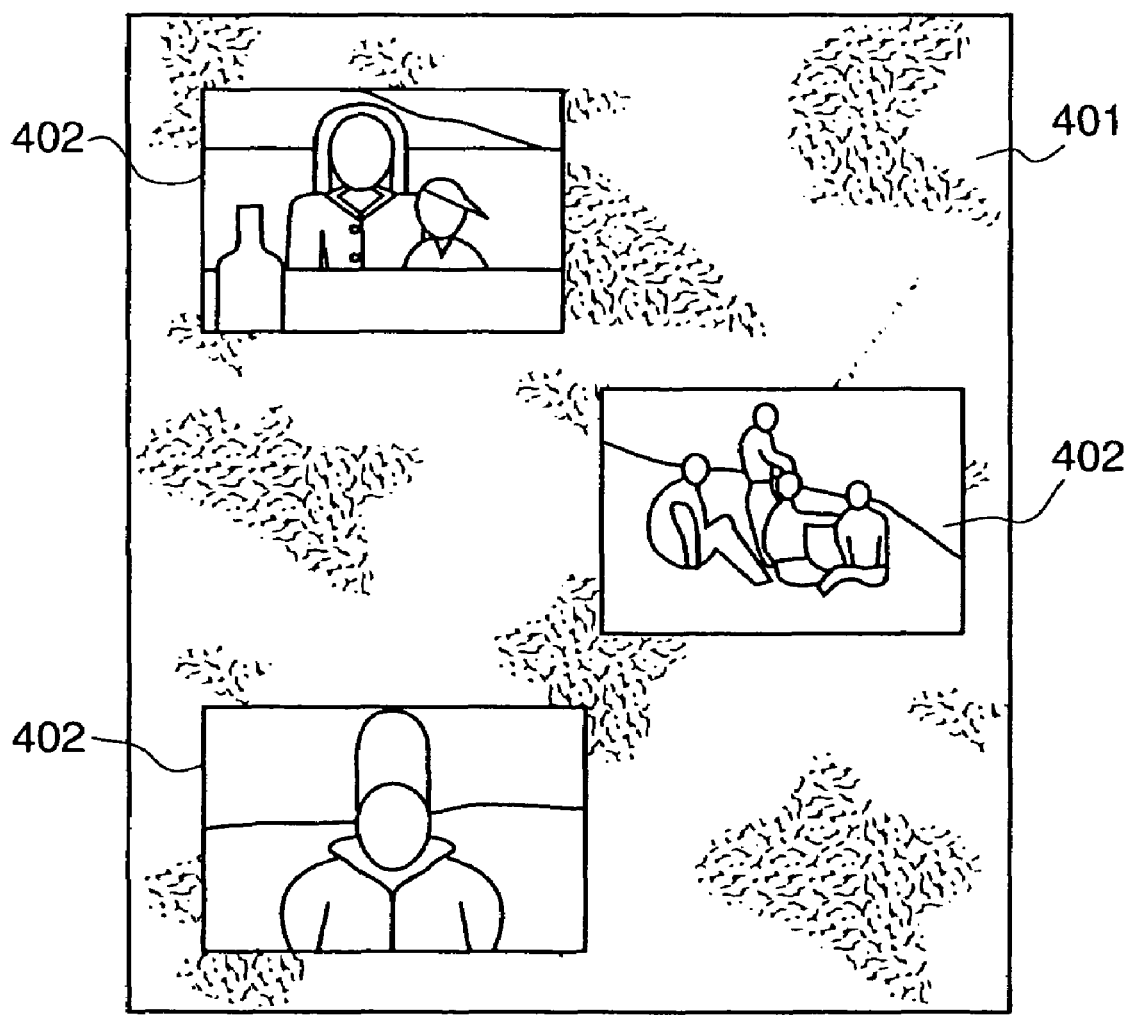
FIG. 4 is a view showing an example of a body page of template the album in the embodiment of the present invention.

FIG. 4 shows a body page of the same template. This body page is composed of wall paper 401 as a pasteboard and image frame 402 in which a photographic image is placed. The user fits a desired original photograph in image frame 402 to form output data. The number of this body pages is not limited to one; a plurality of body pages sometimes continues depending on the number of original photographs.

Processing executed in this embodiment will be described next with reference to FIG. 5.

Figure 5:
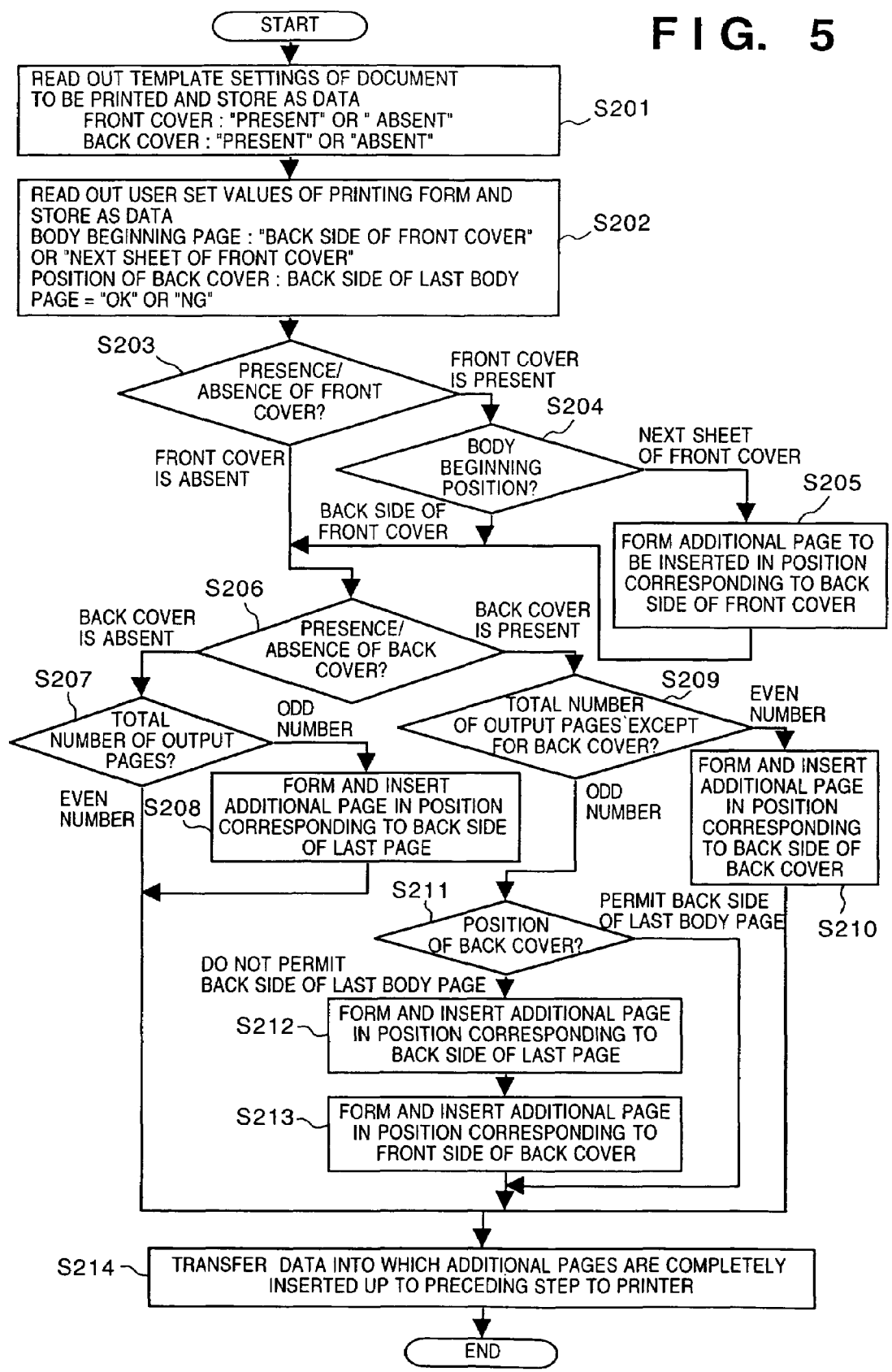
FIG. 5 is a flow chart showing processing executed by the embodiment of the present invention.

FIG. 5 is a flow chart showing processing executed by the embodiment of the present invention.

Processing when both-sided printing is to be performed by the output data of the album template formed as above will be explained.

Figure 6:
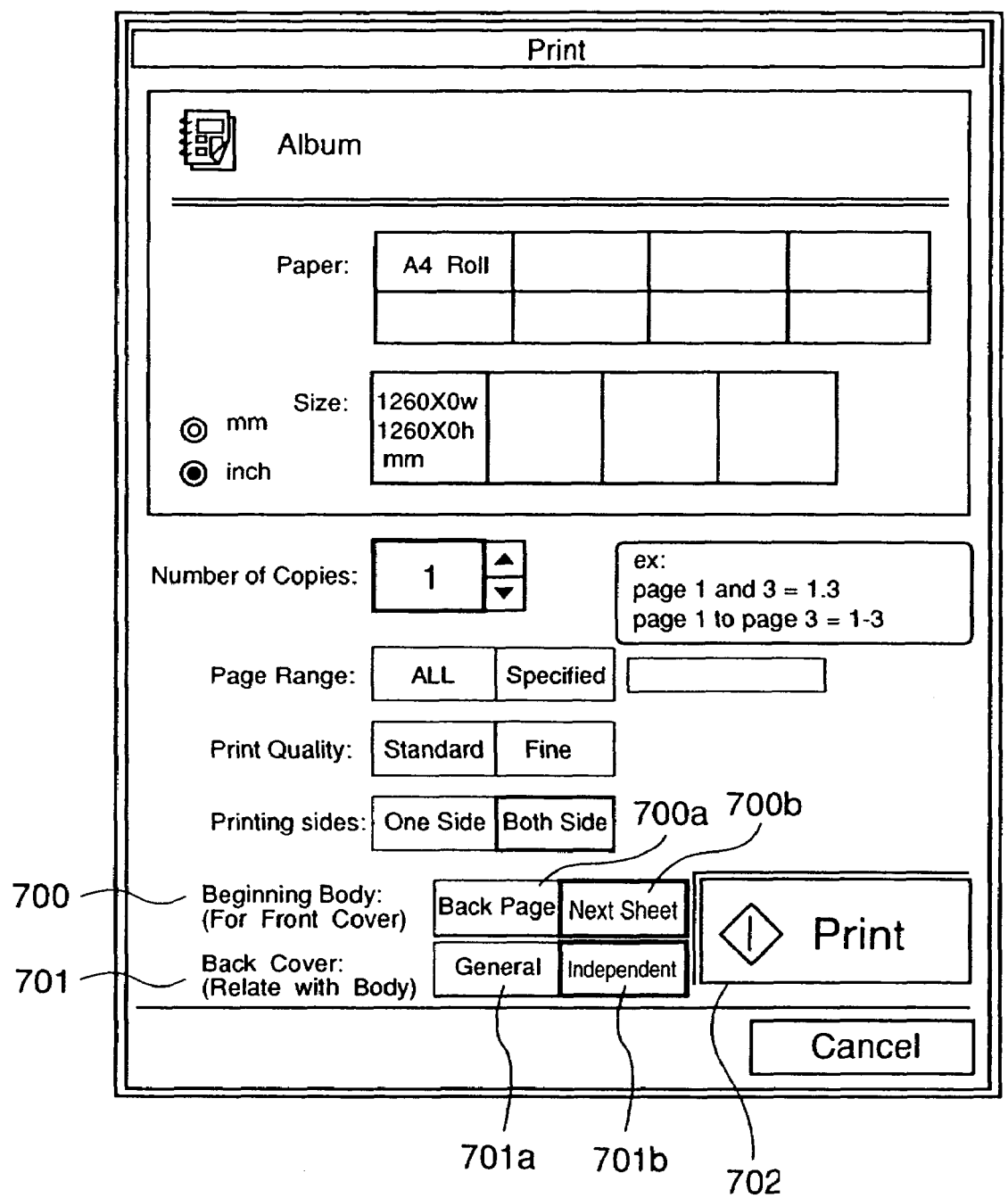
FIG. 6 is a view showing an example of a printing dialogue in the embodiment of the present invention.

Before printing the album template output data completed as described above, the central processing unit 1 displays a printing dialogue as shown in FIG. 6 on the display unit 5. In this printing dialogue, a user can designate the type and size of printing sheet, the number of copies, the page range, and the print quality. The user can also determine "one side" or "both side" printing. When both side is chosen, some processes unique to both-sided printing can be performed. In this embodiment, two items start position of body pages (Beginning Body) 700 and display position of back cover (Back Cover) 701 can be set for the processes.

Figure 7:
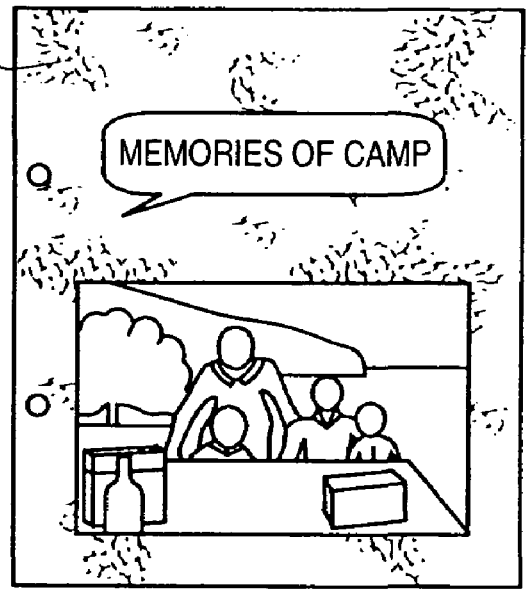
FIG. 7 is a view showing an output example when "body page=back side of front cover page" of an album in the embodiment of the present invention.
Figure 7:
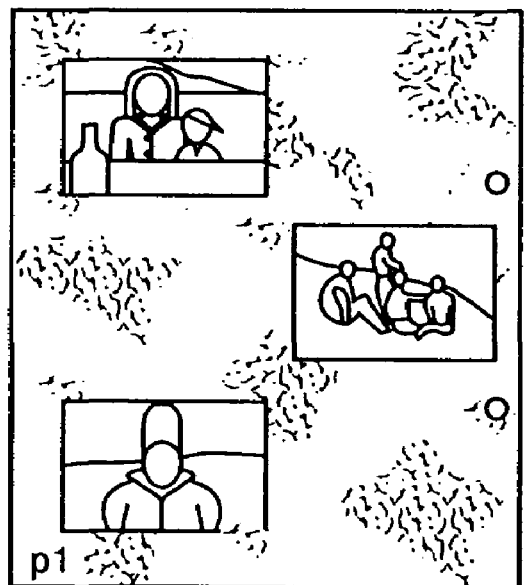
Figure 7:
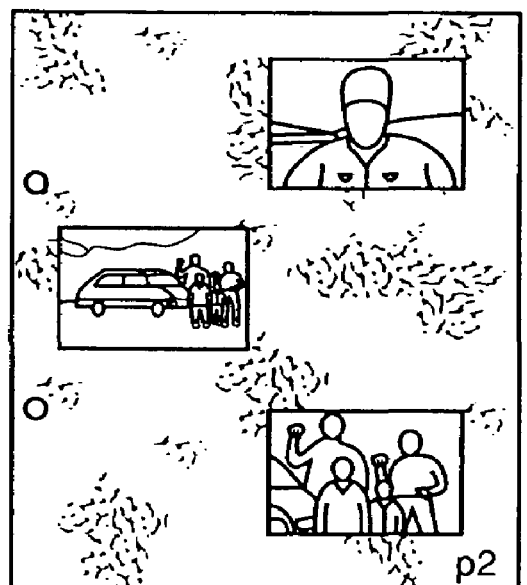
Figure 8:
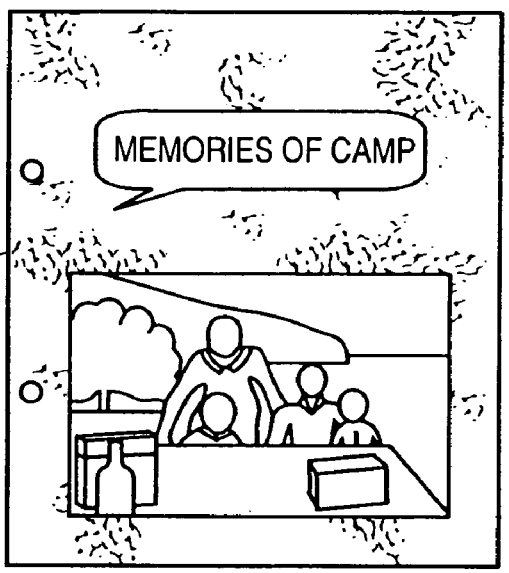
FIG. 8 is a view showing an output example when "body page=next page of front cover page" of an album in the embodiment of the present invention.
Figure 8:
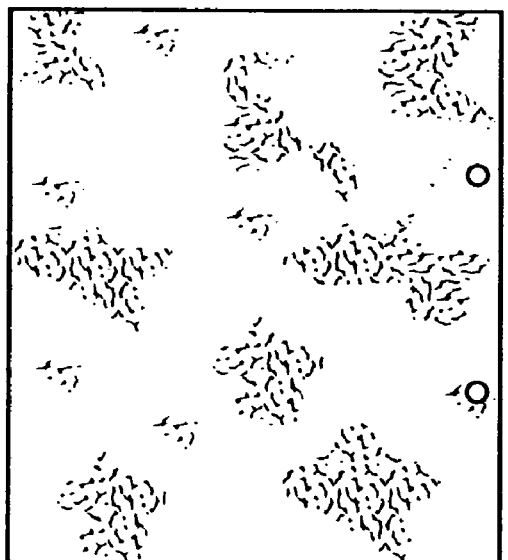
Figure 8:
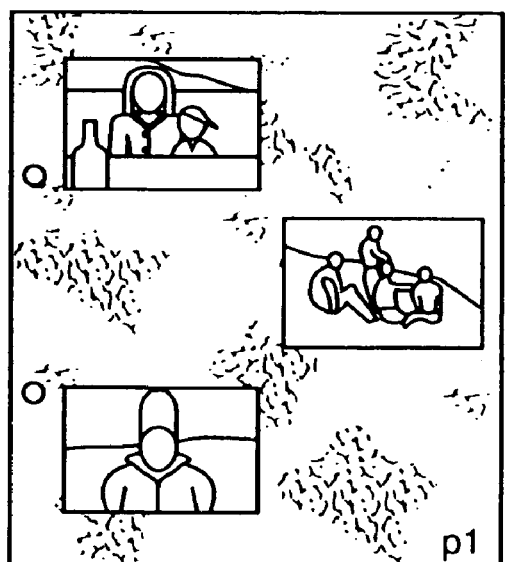

The start position of body pages can be set to back side of cover ("Back Page" button 700a) or next sheet of cover ("Next Sheet" button 700b). FIG. 7 shows an output example when "Back Page" button 700a is chosen. FIG. 8 shows an output example when "Next Sheet" button 700b is chosen. In FIGS. 7 and 8, the top right image 801a is an image of the front page of the first sheet; the bottom left image 801*b* is an image of the back of the first sheet; and the lower right image 802 is the front page of the second sheet. In particular, FIG. 8 shows that a unique insertion page is necessary as the back side page 801*b* of the cover 801*a*.

The display position of back cover can be set to the same sheet as body ("General" button 701*a*) or independent sheet of body ("Independent" button 701*b*). Back cover pairs with front cover and should come to the outermost side when a book is bound. Hence, back cover must be printed on the back side of a sheet.

Figure 9:
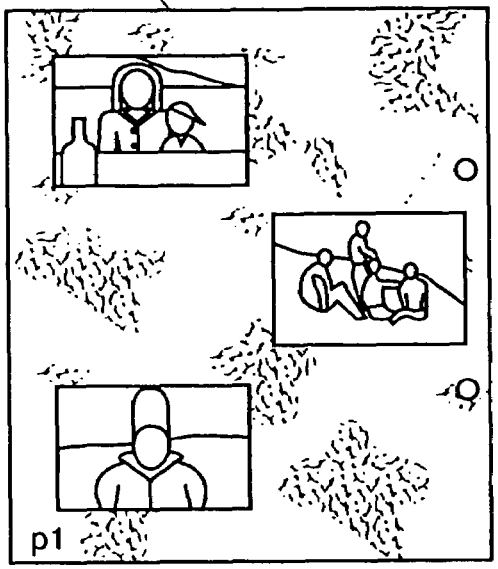
FIG. 9 is a view showing an output example when the last page of the body is a front side and "back cover=the same as body" of an album in the embodiment of the present invention.
Figure 9:
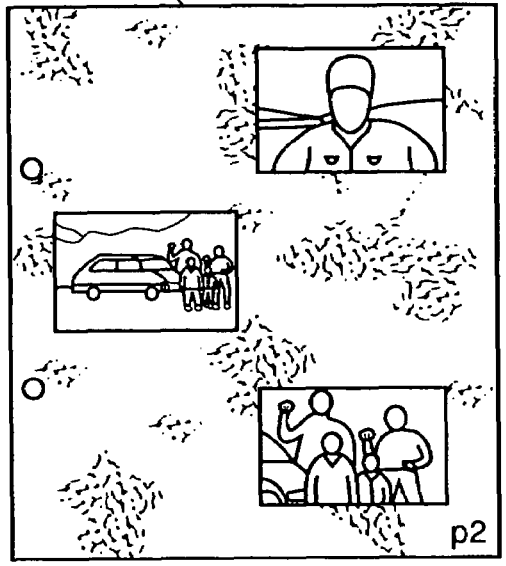
Figure 9:
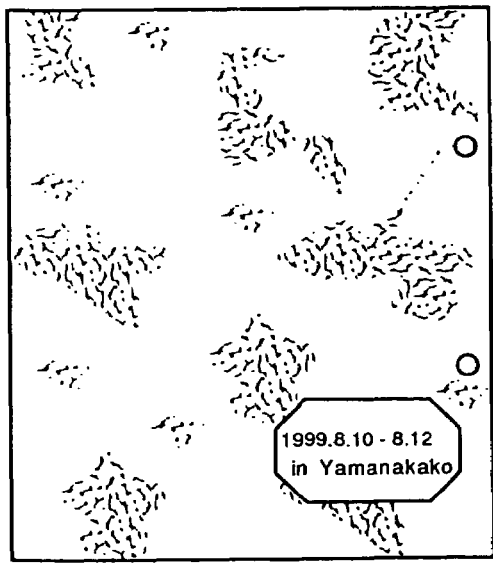
Figure 10:
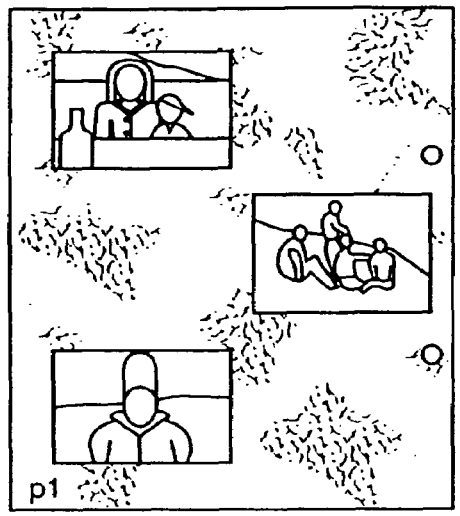
FIG. 10 is a view showing an output example when the last page of the body is a front side and "back cover=independent of body" of an album in the embodiment of the present invention.
Figure 10:
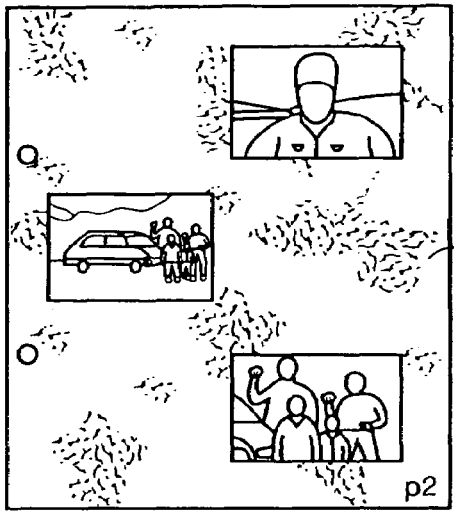
Figure 10:
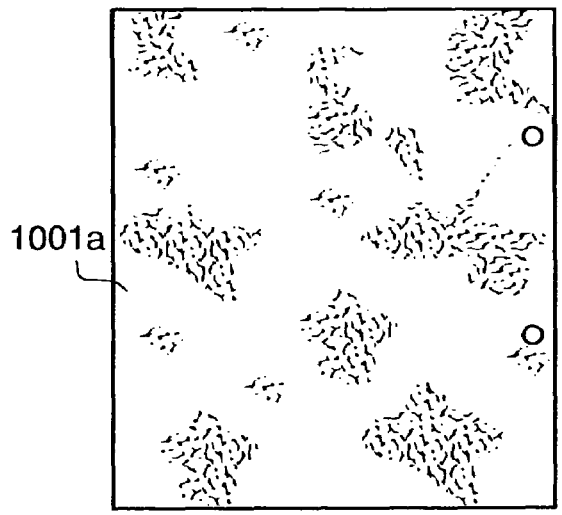
Figure 10:
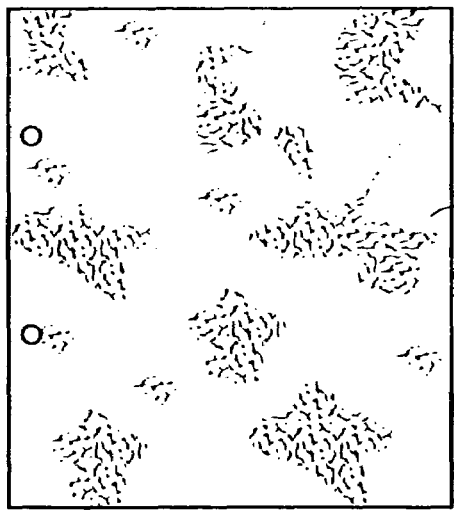
Figure 10:
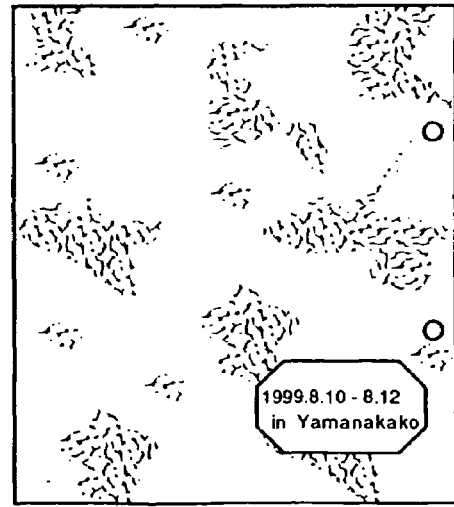

In FIGS. 9 through 12, the bottom left image (902*b* in FIG. 9) is an image of the back page of the last sheet; the top right (902*a* in FIG. 9 and in FIG. 10, the middle right image) is an image of the front page of the last sheet; and the top left image (901 in FIG. 9 and in FIG. 10, the middle left image) is the back page of the second last sheet. In FIG. 10, the top right image is an image of the front page of the second last sheet; the top left image is an image of the back page of the third last sheet.

Figure 11:
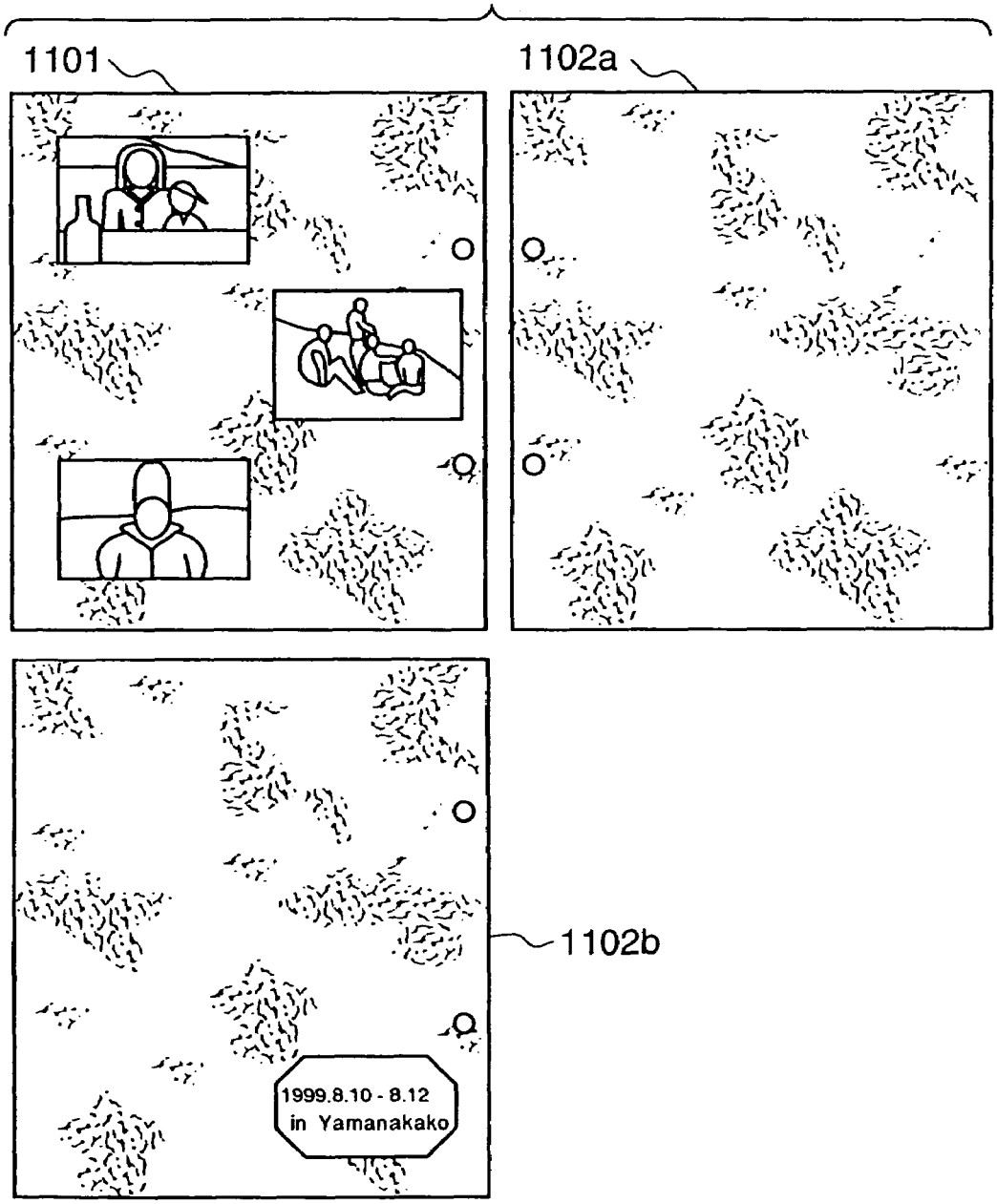
FIG. 11 is a view showing an output example when the last page of the body is a back side and "back cover=outside" of an album in the embodiment of the present invention.
Figure 12:
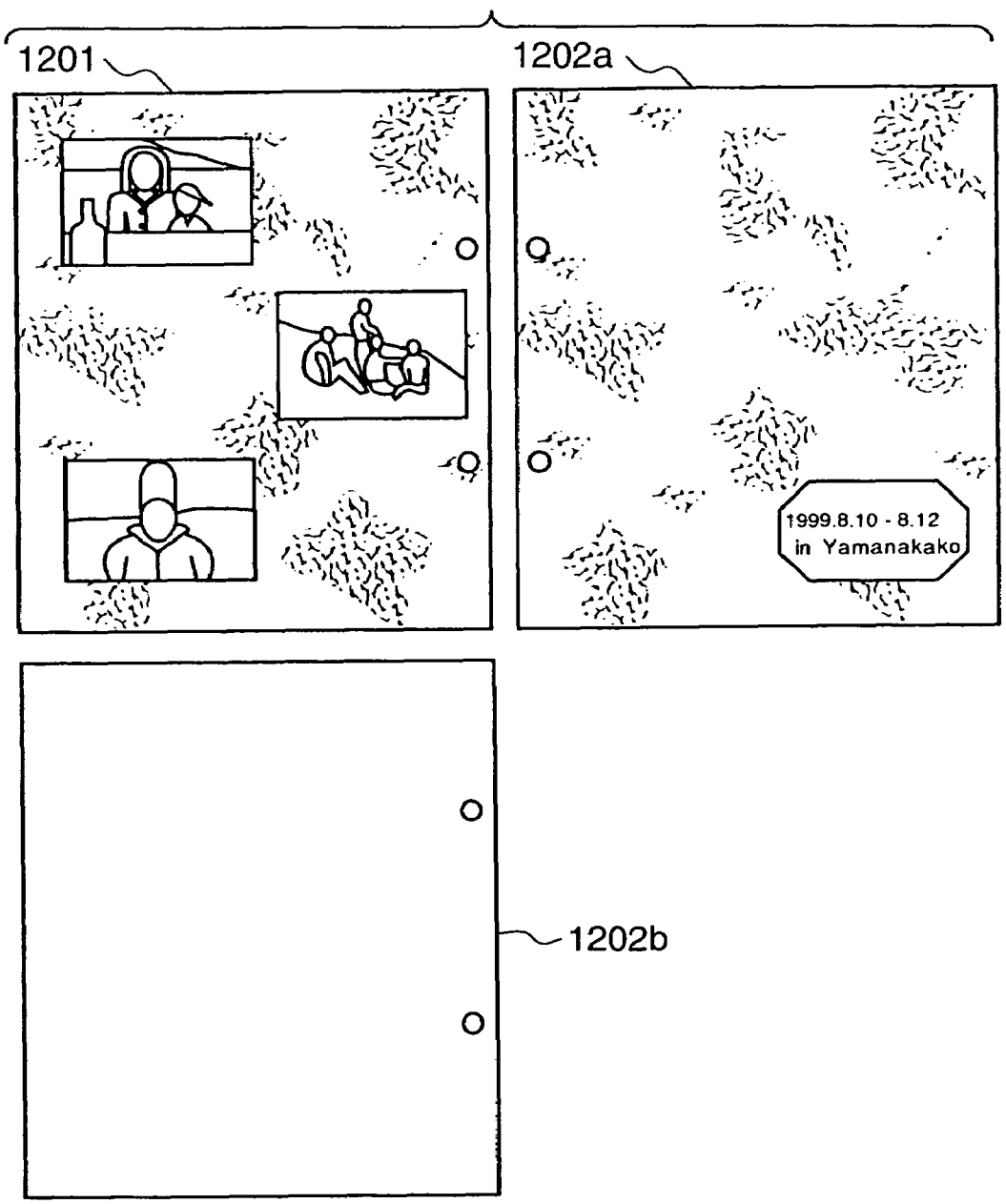
FIG. 12 is a view showing an output example when the last page of the body is a back side and "back cover=inside" of an album in the embodiment of the present invention.

As shown in FIG. 12, if back cover 1202*a* is printed subsequently to body although the last body page 1201 is the back side of an output sheet, the outermost side 1202*b* of the bound book becomes a white page (=solid) having nothing printed on it and hence does not serve as back cover any longer. Therefore, as shown in FIG. 11, if the last body page 1101 is the back side of an output sheet, a separate insertion page 1102*a* corresponding to the front side of back cover 1102*b* is always necessary.

On the other hand, when the last body page is the front side of an output sheet, if "General" button 701*a* is selected, back cover is printed, as shown in FIG. 9, on the back side 901*b* of the last body page 901*a*, subsequently to body (back cover=the same sheet as body), or if "Independent" button 701*b* is selected, a sheet, different from a sheet which the last body page 901*a* is printed, is specially prepared for printing back cover 901*b*, as shown in FIG. 10.

Assume that in the printing dialogue shown in FIG. 6, the user sets "printing sides=both sides", "Beginning Body=Next Sheet", and "Back Cover=Independent", and presses a "Print" button 702 to start printing. Processing in this case will be described below with reference to the flow chart in FIG. 5.

Upon receiving this printing start instruction, the central processing unit 1 reads out the settings of the template of a document to be printed and stores the readout settings in the storage device 2 (step S201). Since the template used is as shown in FIGS. 2 and 3, the storage device 2 stores "front cover=present" and "back cover=present".

The central processing unit 1 then reads out printing format information set in the printing dialogue in FIG. 6 and stores the readout information in the storage device 2 (step S202). Since the set values in this example are as shown in FIG. 6, the storage device 2 stores "Beginning Body=Next Sheet" and "Back Cover=Independent".

Subsequently, the central processing unit 1 reads out the information of "the presence/absence of front cover" stored in step S201 from the storage device 2 and checks the information (step S203). If the central processing unit 1 determines that "front cover=absent", the flow advances to step S206. If the central processing unit 1 determines that "front cover=present", the flow advances to step S204.

Since the set value in this example is "front cover=present", the central processing unit 1 reads out the information of "Beginning Body" stored in step S202 from the storage device 2 and checks the information (step S204). If the central processing unit 1 determines that "Beginning Body=Back Page", the flow advances to step S206. If the central processing unit 1 determines that "Beginning Body=Next Sheet", the flow advances to step S205.

Since the set value in this example is "Beginning Body=Next Sheet", the central processing unit 1 forms a new page by copying the page of front cover shown in FIG. 2. The central processing unit 1 then removes image frame and character frame as components of this new page and leaves only wall paper behind, thereby, as shown in FIG. 8, forming a page 801*b* (having only a pasteboard) to be inserted into a position corresponding to the back side of front cover. The central processing unit 1 adds this page between front cover and the first page of body and stores the data in the storage device 2 (step S205).

Subsequently, the central processing unit 1 reads out the information of "the presence/absence of back cover" stored in step S201 from the storage device 2 and checks the information (step S206). If the central processing unit 1 determines that "back cover=present", the flow advances to step S209. If the central processing unit 1 determines that "back cover=absent", the flow advances to step S207.

In step S207, the central processing unit 1 counts the total number of output pages and checks whether the count is an even number or odd number. If the total number of output pages is an even number, the last page of the body is printed on the back side of a sheet, so printing can be started with the output data formed up. Therefore, the flow advances to step S214. If the total number of output pages is an odd number, the last page of the body is printed on the front side of a sheet, so printing must be started after a page equivalent to a pasteboard of the album is added as the last page. Accordingly, the central processing unit 1 forms a new page by copying the page of body shown in FIG. 4, removes image frame as a component of this new page and leaves only wall paper behind to form an insertion page (having only a pasteboard), adds this insertion page after the last page, and stores the data in the storage device 2 (step S208).

Since it is determined that the set value is "back cover=present" in step S206, the flow advances to step-S209. In step S209, the central processing unit 1 counts the total number of output pages except for the back cover (=the number of output pages−1) and checks whether the count is an even number or odd number. If the total number of output pages, except the back cover, is an even number, the last page of the body 1101 is printed on the back side of a sheet as shown in FIG. 11. Therefore, printing must be started after a page 1102*a* corresponding to the front side of back cover 1102*b* is added as a page before back cover 1102*b*. Hence, the central processing unit 1 forms a new page by copying the page of back cover 1102*b*, removes character frame as a component of this new page to form an insertion page with only wall paper, adds this insertion page 1102*a* immediately before the back cover page 1102*b*, and stores the data in the storage device 2 (step S210).

On the other hand, if the total number of output pages, except the back cover, is an odd number, the last page of the body is printed on the front side of a sheet. Therefore, the central processing unit 1 reads out the information of "the position of back cover" stored in step S202 and checks whether the back cover is to be placed in the position shown in FIG. 9 or 10 (step S21 1). If "Back Cover =General", the output shown in FIG. 9 is desired, and printing can be started with the output data formed up to the point. However, the set value in this example is "Back Cover =Independent", so a desired output form is as shown in FIG. 10. Hence, the central processing unit 1 performs processing by the following two stages.

First, the central processing unit 1 forms a new page by copying a page of the body (for example, the last page of the body 901a), removes image frame as a component of this new page and leaves only the wall paper behind to form an insertion page (a page having only a pasteboard), adds this insertion page 1001a after the last page of the body 901a, and stores the data in the storage device 2 (step S212). Subsequently, the central processing unit 1 forms a new page by copying the page of the back cover 901b, removes character frame as a component of this new page to form an insertion page including only wall paper, adds this insertion page 1001b immediately before the back cover page 901b, and stores the data in the storage device 2 (step S213).

In this manner, the central processing unit 1 appropriately adds a page to obtain the desired output form in accordance with the presence/absence of a cover, the position of a body beginning page, the position of a back cover, and the number of pages to be output. The central processing unit 1 reads out this output data from the storage device 2 and transfers the data to the printing unit 6 (step S214).

In this embodiment as described above, in accordance with various settings corresponding to both-sided printing, output data having set contents is generated and outputted to the printing unit 6. Accordingly, the printing unit 6 can output a printing result having an optimum layout, desired by a user, only by directly printing the received output data.

OTHER EMBODIMENTS

The drawings used in the explanation of the above embodiment are merely examples. For instance, the design of the printing dialogue shown in FIG. 6 can be changed. Also, the setting items of the printing layout for both-sided printing can be changed to contents other than those shown in FIG. 6, or some other items can be added. For example, in FIG. 6 it is possible to add an item for selecting a method of forming an additional page to be inserted in, e.g., the back side of a front cover.

In addition, in the above embodiment a GUI allows a user to set setting items of the print layout for both-sided printing by using the print dialogue shown in FIG. 6. However, it is also possible to include these setting items in the form of registry settings as system information and permit the system to automatically set the setting items of the printing layout in accordance with a service form or a template.

Furthermore, the present invention can also be extended such that page data used only in both-sided printing is formed in a template. As an example, "back side page of front cover" and "front side page of back cover" shown in FIGS. 2 and 3, respectively, can be formed in template data as pages to be used only in both-sided printing. These pages are not used in one-sided printing. Even in both-sided printing, if a layout desired by a user is "body beginning position=back side of front page", "back side page of front cover" is not used. Also, if the last page of the body is the front side and "back cover=the same as body", "front side page of back cover" is not used. Furthermore, it is possible to prepare one-sided printing template data and both-sided printing template data and generate printing data by using necessary template data and deleting unnecessary template data in accordance with printing designation (one-sided printing or both-sided printing).

The present invention can be applied to a system constituted by a plurality of devices (e.g., a host computer, interface, reader, and printer) or to an apparatus (e.g., a copying machine or facsimile) comprising a single device.

Further, the object of the present invention can also be achieved by providing a storage medium storing program codes of software for performing the aforesaid functions according to the embodiments to a system or an apparatus, reading the program codes with a computer (or a CPU or MPU) of the system or apparatus from the storage medium, and then executing the program.

In this case, the program codes read from the storage medium realize the functions according to the embodiments, and the storage medium storing the program codes constitutes the invention.

As the storage medium for providing the program codes, it is possible to use, e.g., a floppy disk, hard disk, optical disk, magnetooptical disk, CD-ROM, CD-R, magnetic tape, nonvolatile memory card, and ROM.

Furthermore, besides aforesaid functions according to the above embodiments are realized by executing the program codes which are read by a computer, the present invention includes a case where an OS (Operating System) or the like running on the computer performs a part or the whole of actual processing in accordance with designations by the program codes and realizes functions according to the above embodiments.

Furthermore, the present invention also includes a case where, after the program codes read from the storage medium are written in a memory of a function extension board which is inserted into a computer or of a function extension unit which is connected to a computer, a CPU or the like of the function extension board or unit performs a part or the whole of actual processing in accordance with designations by the program codes and realizes functions of the above embodiments.

When the present invention is applied to the storage medium, this storage medium stores program codes corresponding to the flow chart shown in FIG. 5 explained earlier.

As has been described above, the present invention can provide an information processing apparatus and method and computer-readable memory capable of easily realizing printing in a printing layout desired by a user.

The present invention is not limited to the above embodiments and various changes and modifications can be made within the spirit and scope of the present invention. Therefore, to apprise the public of the scope of the present invention, the following claims are made.

What is claimed is:

1. An information processing apparatus for generating print data including a plurality of body pages to be printed on both sides of a plurality of sheets, said apparatus comprising:

setting means for setting whether all of the body pages are positioned on independent sheets other than a sheet containing a front cover page or one of the body pages is positioned on a back side of the front cover page, and whether or not the body pages are positioned on independent sheets other than a sheet containing the back cover page;

first generating means for generating an insert page to be positioned on the back side of the front cover page, in a case where it is set that all of the body pages are positioned on independent sheets other than a sheet containing the front cover page by said setting means;

second generating means for generating at least one insert page to be positioned between the last page of the body pages and the back cover page, in a case where it is set that the body pages are positioned on independent sheets other than a sheet containing the back cover page; and positioning means for:
  positioning a single insert page generated by said first generating means between the top page of the body pages and the front cover page in a case where it is set that all of the body pages are positioned on independent sheets other than a sheet containing the front cover page,
  positioning the top page of the body pages on the back side of the front cover page without generating the insert page, in a case where it is set that the one of the body pages is positioned on the back side of the front cover page,
  positioning two insert pages generated by said second generating means between the last page of the body pages and the back cover page, in a case where it is set that the body pages are positioned on independent sheets other than a sheet containing the back cover page and where the last page of the body pages is positioned on the front side of a sheet; and
  positioning a single insert page generated by said second generating means between the last page of the body pages and the back cover page, in a case where it is set that the body pages are positioned on independent sheets other than a sheet containing the back cover page and where the last page of the body pages is positioned on the back side of a sheet,
wherein the front cover page and the back cover page have a background image,
wherein said first generating means generates an insert page having the background image by removing an image frame and text frame from a new front cover page which is generated by copying the front cover page, and
wherein said second generating means generates at least one insert page having the background image by removing an image frame and text frame from a new back cover page which is generated by copying the back cover page.

2. An apparatus according claim 1, further comprising,
storing means for template data which includes the front cover page and at least one of the plurality of body pages; and
fitting means for fitting one or more desired original images in one or more placing frames of the body pages and generating an output body page.

3. The apparatus according to claim 2, wherein in said fitting means, each of a plurality of the placing frames of the body pages is fitted by the original images.

4. An information processing method of generating print data including a plurality of body pages to be printed on both sides of a plurality of sheets, comprising the steps of:
  setting whether all of the body pages are positioned on independent sheets other than a sheet containing a front cover page or one of the body pages is positioned on a back side of the front cover page, and whether or not the body pages are positioned on independent sheets other than a sheet containing the back cover page;
  a first generating step of generating an insert page to be positioned on the back side of the front cover page, in a case where it is set all of that the body pages are positioned on independent sheets other than a sheet containing the front cover page in said setting step;
  a second step of generating at least one insert page to be positioned between the last page of the body pages and the back cover page, in a case where it is set that the body pages are positioned on independent sheets other than a sheet containing the back cover page; and positioning a single insert page generated by said first generating means between the top page of the body pages and the front cover page in a case where it is set that all of the body pages are positioned on independent sheets other than a sheet containing the front cover page, positioning the top page of the body pages on the back side of the front cover page without generating the insert page, in a case where it is set that the page is positioned on the back side of the front cover page,
  positioning two insert pages generated by said second generating means between the last page of the body pages and the back cover page, in a case where it is set that the body pages are positioned on independent sheets other than a sheet containing the back cover page and where the last page of the body pages is positioned on the front side of a sheet; and
  positioning a single insert page generated said second generating means between the last page of the body page and the back cover page, in a case where it is set that the body pages are positioned on independent sheets other than a sheet containing the back cover page and where the last page of the body pages is positioned on the back side of a sheet,
wherein the front cover page and the back cover page have a background image, and
wherein said first generating step generates an insert page having the common background image by removing an image frame and text frame from a new front cover page which is generated by copying the front cover page, and
wherein said second generating means generates at least one insert page having the background image by removing an image frame and text frame from a new back cover page which is generated by copying the back cover page.

5. A method according claim 4, further comprising,
storing template data which includes the front cover page and at least one of the plurality of body pages; and
fitting one or more desired original images in one or more placing frames of the body pages and generating an output body page.

6. The method according to claim 5, wherein in said fitting step, each of a plurality of the placing frames of the body page is fitted by the original images.

7. A computer readable medium having a stored computer program code for a method of generating print data including a plurality of body pages to be printed on both sides of a plurality of sheets, said computer program code comprising the steps of:
  setting whether all of the body pages are positioned on independent sheet other than a sheet containing a front cover page or one of the body pages is positioned on a back side of the front cover page, and whether or not the body pages are positioned on independent sheets other than a sheet containing the back cover page;
  a first generating step of generating an insert page to be positioned on the back side of the front cover page, in a case where it is set that all of the body pages are positioned on independent sheets other than a sheet containing the front cover page in said setting step;
  a second generating step of generating at least one insert page to be positioned between the last page of the body pages and the back cover page, in a case where it is set that the body pages are positioned on independent sheets other than a sheet containing the back cover page;

positioning a single insert page generated by said first generating means between the top page of the body pages and the front cover page in a case where it is set that all of the body pages are positioned on independent sheets other than a sheet containing the front cover page, positioning the top page of the body pages on the back side of the front cover page without generating the insert page, in a case where it is set that the page is positioned on the back side of the front cover page, positioning two insert pages generated by said second generating means between the last page of the body pages and the back cover page, in a case where it is set that the body pages are positioned on independent sheets other than a sheet containing the back cover page and where the last page of the body pages is positioned on the front side of a sheet; and positioning a single insert page generated by said second generating means between the last page of the body pages and the back cover page, in a case where it is set that the body pages are positioned on independent sheets other than a sheet containing the back cover page and where the last page of the body pages is positioned on the back side of a sheet, wherein the front cover page and the back cover page have a background image, and wherein said first generating step generates an insert page having the background image by removing an image frame and text frame from a new front cover page which is generated by copying the front cover page, and wherein said second generating means generates at least one insert page having the background image by removing an image frame and text frame from a new back cover page which is generated by copying the back cover page.

8. A computer readable medium according claim 7, said computer program code further comprising the steps of, storing template data which includes the front cover page and at least one of the plurality of body pages; and fitting one or more desired original images in one or more placing frames of the body pages and generating an output body page.

9. The computer readable medium according to claim 8, wherein in said fitting step, each of a plurality of the placing frames of the body page is fitted by the original images.

* * * * *

UNITED STATES PATENT AND TRADEMARK OFFICE
CERTIFICATE OF CORRECTION

| | |
|---|---|
| PATENT NO. | : 7,345,776 B2 |
| APPLICATION NO. | : 11/091625 |
| DATED | : March 18, 2008 |
| INVENTOR(S) | : Asami |

It is certified that error appears in the above-identified patent and that said Letters Patent is hereby corrected as shown below:

IN THE DRAWINGS:
Sheet No. 6, Figure 6, "Both Side" should read --Both Sides--.

COLUMN 1:
Line 44, "An" should read --an--.
Line 56, after "of the first sheet, respectively," insert --and image data on both sides of each subsequent sheet, and when the first mode is determined, the cover image, the image generated in the generation step, and the body images are printed on the first side of the first sheet, on the second side of the first sheet, and on both sides of each subsequent sheet starting from the first side of the second sheet, respectively.

Another aspect of the invention is, an information processing method of printing images on a plurality of pages, on both sides, comprising: a step of printing a first image of the images of the plurality of pages on a first side of a first sheet; a generation step of automatically generating an image to be printed on a second side of the first sheet; and a step of sequentially printing second and subsequent images of the images on the plurality of pages, on both sides of each subsequent sheet, starting from a first side of a second sheet.

Another aspect of the invention is, an information processing method of printing a cover image and body images on both sides of a plurality of sheets, comprising: a step of determining one of a first mode for allowing the cover image and the body image to be printed on different sides of the same sheet and a second mode fr inhibiting the cover image and the body image to be printed on different sides of the same--.
Line 59, "The another" should read --Another--.

COLUMN 2:
Line 1, "The another" should read --Another--.
Line 20, "The another" should read --Another--.
Line 30, "The another" should read --Another--.

COLUMN 4:
Line 40, "pages" should read --page--.
Line 50, "completed" should read --completely--.

COLUMN 6:
Line 61, "(step S21 1)." should read --(step S211).--.

COLUMN 9:
Line 67, "and" should be deleted.

UNITED STATES PATENT AND TRADEMARK OFFICE
CERTIFICATE OF CORRECTION

PATENT NO. : 7,345,776 B2
APPLICATION NO. : 11/091625
DATED : March 18, 2008
INVENTOR(S) : Asami It is certified that error appears in the above-identified patent and that said Letters Patent is hereby corrected as shown below:

COLUMN 10:
Line 51, "sheet" should read --sheets--.

COLUMN 11:
Line 6, "page, positioning" should read --page; ¶ positioning--.

COLUMN 12:
Line 12, "according" should read --according to--.

Signed and Sealed this

Thirtieth Day of September, 2008

JON W. DUDAS
*Director of the United States Patent and Trademark Office*